July 6, 1965 A. W. HOLT 3,193,799

READING MACHINE WITH TIME-SPATIAL DATA EXTRACTION

Filed June 6, 1961

3 Sheets-Sheet 1

INVENTOR

Arthur W. Holt

BY Joseph A. Genovese & Max L. Libman

ATTORNEYS

INVENTOR
Arthur W. Holt
BY Joseph A. Genovese & Max L. Libman
ATTORNEYS

July 6, 1965 A. W. HOLT 3,193,799

READING MACHINE WITH TIME-SPATIAL DATA EXTRACTION

Filed June 6, 1961 3 Sheets-Sheet 3

INVENTOR
Arthur W. Holt

BY Joseph A. Genovese & Max L. Libman

ATTORNEYS 3,193,799

READING MACHINE WITH TIME-SPATIAL DATA EXTRACTION

Arthur W. Holt, Silver Spring, Md., assignor, by mesne assignments, to Control Data Corporation, Minneapolis, Minn., a corporation of Minnesota Filed June 6, 1961, Ser. No. 115,165
9 Claims. (Cl. 340—146.3)

This invention relates to reading machines and particularly to high-speed, low-cost machines.

Prior reading machines proposed and/or constructed, capable of operating at a reasonably high character-identification rate are both complex and expensive. An objective of my invention is to provide a high-speed reading machine whose principle of operation and features make it possible to construct a machine at a comparatively low cost. For example, I use an analog storage which is considerably more inexpensive than digital storage, and also provides certain advantages which are discussed later.

A machine designed in accordance with my invention simplifies the recovery and processing of scan information derived from the scanning of a character. This is achieved by establishing a hypothetical grid of time slots coordinated with the scanning of a character, and when obtaining scan information its time-position in the grid bears an intelligible relationship to the shape of the scanned character thereby facilitating recognition of the character.

The time-grid may be generated very simply, for example by successive actuation of a group of multivibrators for each scan line of a character. To facilitate understanding, assume that the succession of multivibrators defines a Y-axis whose duration corresponds to the vertical height of the character. Additional multivibrators are used to establish an X-axis, these corresponding to the width (horizontal dimension) of the character.

An important feature of my invention is that the time of each multivibrator may be selected so that certain time slots favor the longer but narrower features of the group of characters capable of being recognized by the machine.

Another feature of the invention is analog storage for temporarily remembering scan line crossings in a particular time slot. Thus, if the characters are uniformly made of narrow lines or uniformly made of wide lines the proportionate memory for the various parts of a given character will be the same. As used herein, analog storage is the storage of data proportional to the information from which the data is derived. For example, if a scan element detects a light gray portion of a character (usually its image), the signal derived therefrom is proportional to the optical density of the light gray portion. If the scan element detects a dark gray portion of the character, the signal will be proportionately larger (or smaller) than the signal from the examination of the light gray. The same is true of a long signal and a brief signal which will result from crossing a character element lengthwise or transversely. One type of such an analog storage device is a capacitor whose charge can be built up proportionate to the number and intensity of the input signals.

An advantage of my analog storage feature is that character elements in given time-slot areas may be scanned a number of times, and each character element crossing is remembered. The signal stored for each crossing is proportional to the optical density of the element at the place of crossing. If a character element has a small defect, for example a missing corner, one or two of a possible ten or twenty scans may miss the feature completely. But in most cases sufficient information to recognize the element (as part of a character) can be obtained from the other crossings of the element.

Another object of my invention is to provide a reading machine of comparatively low cost, which solves the well-recognized problem of identifying vertically misregistered characters. This objective is achieved by the establishment of the aforementioned grid in such a way that it bears a precise time-spatial relationship to the scanning of the character. More specifically, the upper limit of the first horizontal time slot (activating the first of the Y-axis group of multivibrators) is remembered, i.e. the distance from an artificial reference to the upper edge of the character. Thereafter, for the successive scans of a character, the group of multivibrators (or the equivalent) are triggered with the same trigger timing, established by reference to the memory. Consequently, when a line of characters is read by my machine it makes no difference whether the characters are out of vertical register or not. In a sense, the time-grid is established where the image of the character actually falls, independent of the positions of the adjacent characters.

Other objects and features of importance will become evident in following the description of the illustrated form of the invention.

FIGURE 1 is a diagrammatic view showing the circuitry of my machine.

FIGURE 1*a* shows a few characters made of a "matchstick" font, as one example of characters which are easily identified by my reading machine.

FIGURE 2 is a fragmentary view showing a character being scanned.

FIGURE 2*a* is a view showing a time slot chart identifying the various areas of the grid along *x* and *y* axes.

Figure 4:
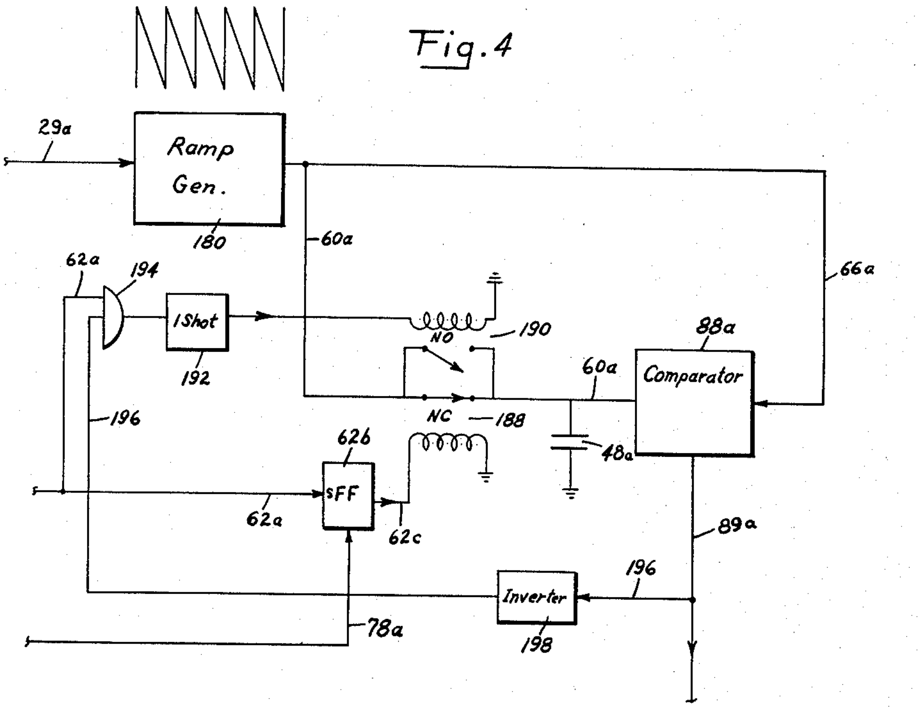
FIGURE 4 shows a modification to enlarge the reading scope of the machine.
Figure 4A:
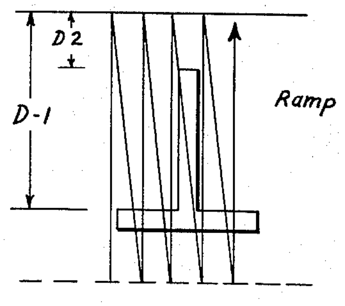

FIGURE 4*a* is a diagrammatic view pertinent to FIGURE 4.

*Introduction*

Before proceeding with the description of the illustrated embodiment (FIGURE 1) of the reading machine the general nature of the invention will be more easily understood by referring to FIGURES 1*a*, 2, 2*a* and 3. Scanner 10 (FIGURE 2) is composed of a disc 12 having apertures 13, 14, 15, etc., uniformly spaced in a circle, across which an image of the character is swept, e.g. horizontally, through window 20 of mask 18. Any suitable paper mover and optical system (not shown) are used to project and move the character images across mask 18. Mask 18 is superposed over scanning disc and it has a slot, defining window 20, whose length slightly exceeds the distance between any two holes, e.g. holes 14 and 15 of the disc. Photosensitive pickup device 22, such as a photomultiplier, is disposed behind the scanning disc. Thus, when an image of a character is projected on and moves across mask 18, it is scanned, and the scan information is picked up and transduced to electrical signals by the photomultiplier. Scanner 10 is given by way of example and may be replaced by other types of scanners.

In processing the data gathered by the scanner (electrical outputs from the photomultiplier), my invention establishes a grid of time slots along X and Y axes. A "time slot" as used herein, is predetermined brief interval of time. A "Y axes time slot" (FIGURE 2*a*) is proportional to the time required for a scan hole, e.g. hole 15, to traverse the character image. The "X axis time slots" are arbitrarily selected to correspond in time to that required for the character image to move horizontally across window 20. The Y axis time slots are established for each scan line of the character, each of which is generated by one of the holes sweeping essentially vertically (as shown) behind window 20. The intersecting X time slots are initiated when the character is first detected by the scanner and discontinued at the end of the character. They are established for each character. How this is done involves circuit details which are described later. At this point, it is noted that the Y time slots or zones are reestablished for each scan line of the character, and the X time slots or zones are established only once for a character.

By generating a time-grid in this way, when a character is detected, the information outputs of the scanner will fall within the various time zones so that the pieces, bits or elements making up the character are positionally remembered. When all of the scanned data concerning the character has been stored in a very simple analog memory (explained later) a decision as to the identity of the character is made on the basis of the remembered data.

Figure 1:
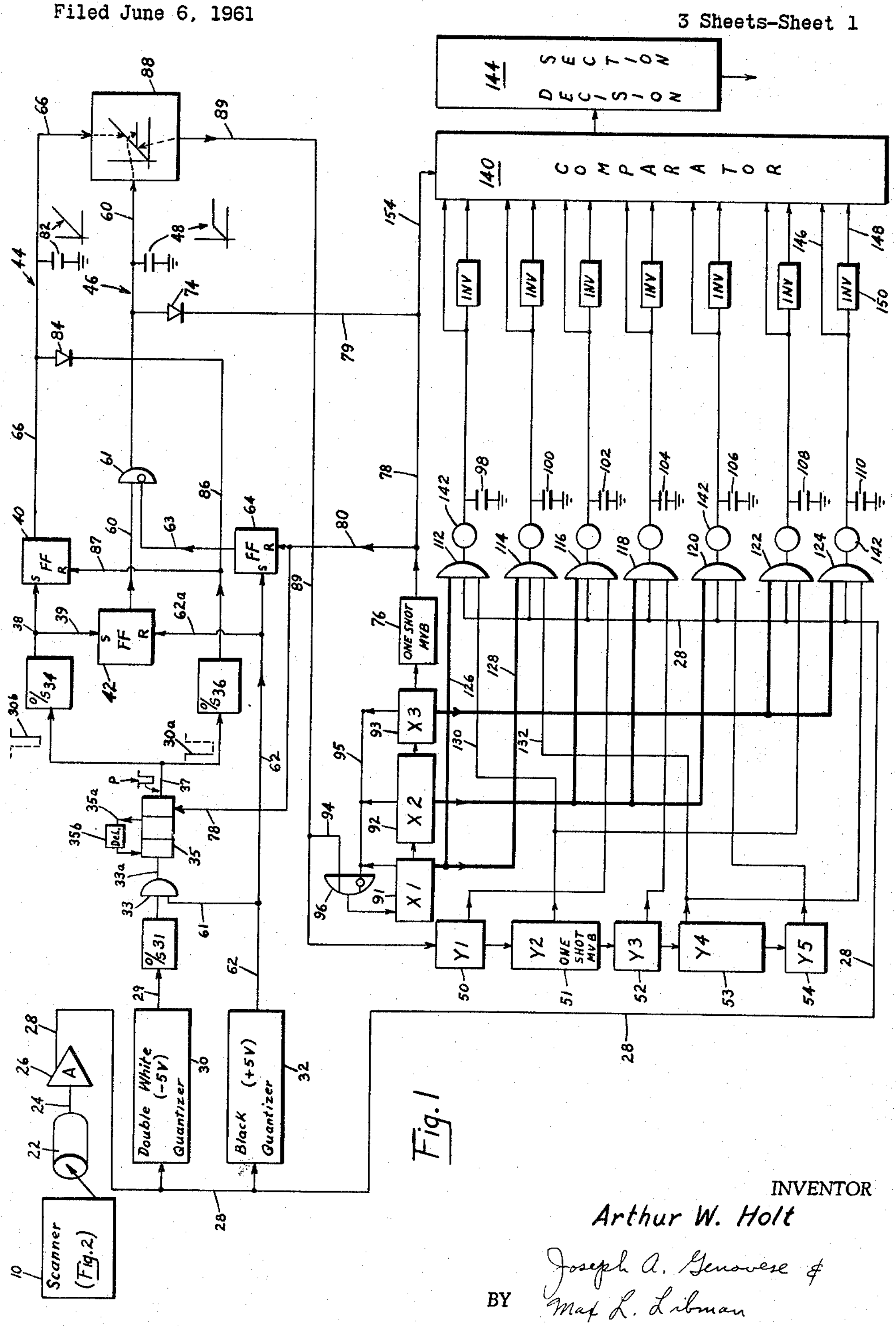
Figures 1A, 2, 2A, 3:
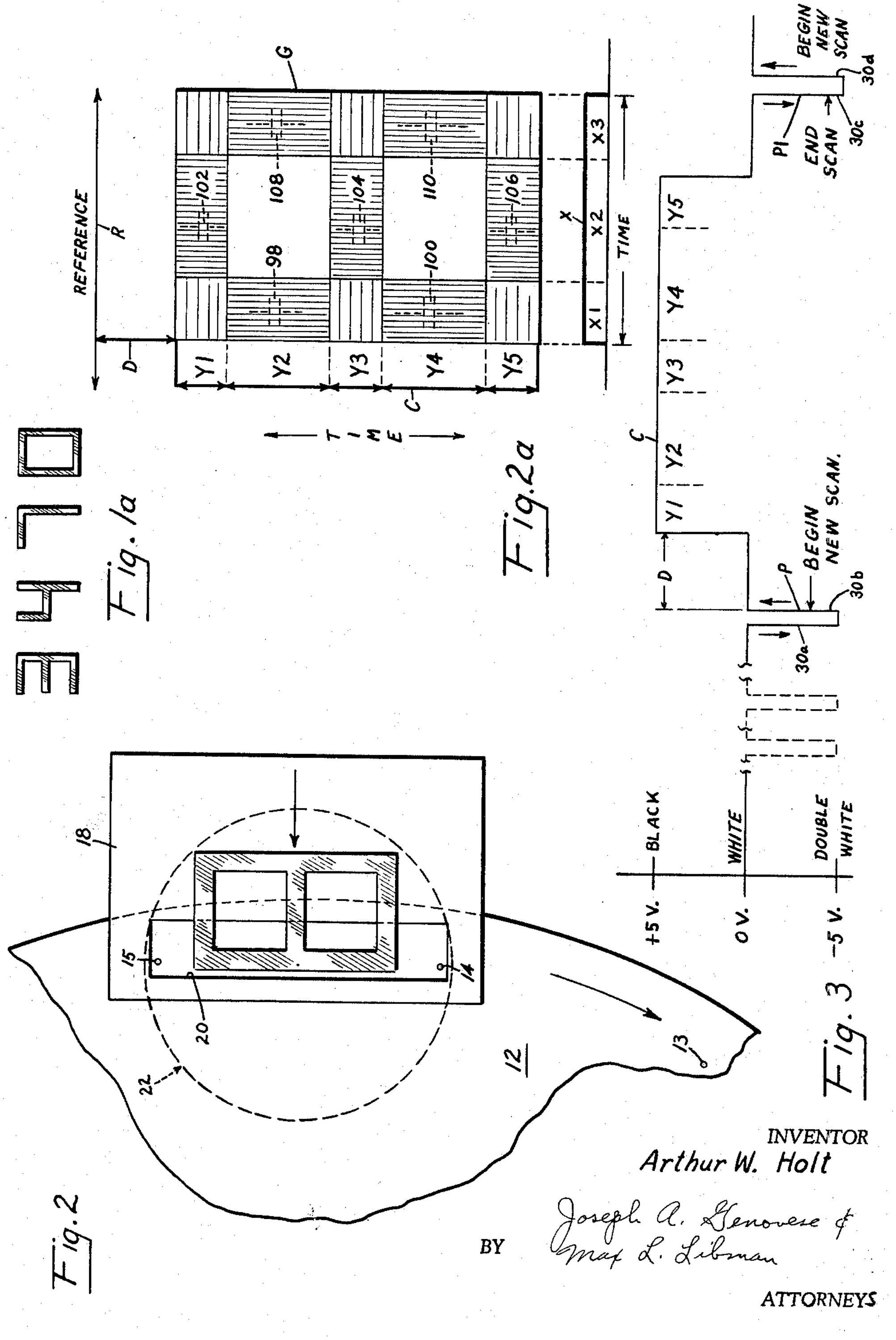
FIGURE 3 is a timing diagram.

FIGURE 1*a* shows a few characters of a "matchstick" font, so identified because all of the numerals and many of the letters of the alphabet may be defined by arranging only seven elements (matchsticks) to form the characters. U.S. Patent No. 2,963,220 discloses a font very similar to the "matchstick" font. The elements are arranged at three horizontal stations and two vertical stations with each vertical station made of two elements in tandem. The vertical elements of the characters are at the beginning and/or end of the characters. This font is described as an example only, and my reading machine is not restricted to any particular font. In scanning characters which have a piece at the upper left corner (FIGURES 1*a* and 2) it is easy to determine the top edge of the character. Also, it is evident that the vertical scan line may be in succession right-to-left (instead of left-to-right as shown in FIGURE 2) in which case the upper right corner would be the significant corner of the character. Alternatively, I could just as easily look for the lower corners (e.g. by optically turning the character images up-side-down when projected for scanning). There are cases where a font does not have all characters with a piece at one corner, but to simplify the description, these cases are not specifically considered until the end of the specification (FIGURES 4 and 4*a*).

Another advantage in choosing the matchstick font for description herein is that it shows clearly how vertically scanning a transverse part of a character will produce a short signal. But when a vertical part of the character is vertically scanned (scanned along its length), the resulting signal will be of a longer duration. Analog storage takes cognizance of these differences. The width of the vertical time slots at the beginning and end of the character is made smaller than the center slot or slots. The end slots may have ten scans each while the center slot has twenty scans (or any other number or proportion). This arrangement automatically compensates for the longer signals usually occurring at the beginning and end of a character, and the short signals at the center.

Attention is now directed to the scanner in FIGURE 2 and the upper left corner of FIGURE 1, and the timing chart in FIGURE 3. The output line 24 from the photomultiplier has an amplifier 26 from which signal line 28 extends. When the image of a character moves into the field of view of the scanner, the first thing that happens is that the time slot grid is established. Therefore, this phase of my invention will be described first. I use the "double white" system (FIGURE 2) to detect the leading edge of a character. A "double white" is explained below. The photomultiplier amplifier gain is adjusted so that when the photomultiplier sees "white" through one hole in disc 12 the output on signal line 28 will be zero volts (FIGURE 3). When the photomultiplier sees "white" through two holes simultaneously (e.g. holes 14 and 15 in FIGURE 2) this is a "double white" (photomultiplier sees twice as much light through two holes as through one hole), and the output voltage on line 28 will be a negative value, for instance −5 volts. When the photomultiplier sees no "white" through any hole, as would be the case when disc 12 is rotated a few degrees in the direction of the arrow, and hole 15 is covered by the image of the character, the output on line 28 will be positive, for instance +5 volts. The voltage levels are indicated by legend in FIGURE 3.

Since a "double white" signal is produced each time that the photo multiplier sees a pair of holes simultaneously, there will be a continual succession of such signals (shown in dotted lines in FIGURE 3), including the time when the space between characters is scanned. Thus, my circuits require that there be a "double white" signal followed by an information signal (plus 5 volts as shown in FIGURE 3) before the next "double white," as a condition precedent to establishing the time zones or slots. In fact, to prevent false starts which may occur due to the scanning of a piece of dirt of other "noise" on the paper, I will later show how I prefer to require two or more successive groups ("double white"—black—"double white") before triggering my time slot generating means.

The curve C between the two successive double white signals P and P1 in FIGURE 3 represents the generation of one Y axis time slot. FIGURE 2*a* has the same curve C reproduction to the left of a grid of intersecting X and Y time slots. The reference line R in FIGURE 2*a* represents (in time) one "double white" signal which determines that a character has come within the field of view of the scanner. Distance D represents a measurement of the time required for the "double white" signal to cease and a "dark" signal (+5 volts) to appear at the photomultiplier output terminal. In terms of space, D represents the distance which hole 15 (FIGURE 2) travels to reach and become covered by the image of the character.

Since the Y axis time slots are reestablished for each scan line of the character, curve C will be repeated once for each scan line. However, the X axis time slots are established on a real time basis, once for each character. The duration of the X axis time slots is represented by curve X in FIGURE 2*a*. The grid G of time slots (FIGURE 2*a*) is established by the intersections of the X and Y axes time slots or zones, and those which are used to identify characters of the matchstick font are indicated as the vertically shaded areas with memory capacitors (described later) superposed thereon in dotted lines.

*Timing circuits*

The upper part of FIGURE 1 shows circuits for detecting a character and establishing the time slot grid G (FIGURE 2*a*). Initially, I distinguish between the double white signals produced when the space between characters is scanned, and those appearing when the character itself is being scanned, as follows: Output signal line 28 from amplifier 26 is connected to "double white" quantizer 30 and a "black" quantizer 32. The quantizer circuits are conventional, the quantizer 30 providing a clean output pulse in response to a −5 volt (for example) input signal, and the quantizer 32 providing an output pulse in response to a +5 volt (for example) input signal. Specific quantizer circuits are described in copending application Serial No. 32,911, now Patent No. 3,104,369. The output line 29 of quantizer 30 operates one-shot multivibrator 31 whose output is of a predetermined duration (long enough to enable hole 15 in FIGURE 2 to move to about the center of window 20). The one shot output forms one input of a two-input AND gate 33, and the other input is on line 61, attached to the output line 62 of the black quantizer 32. Thus, when there is a double white followed by a black on line 28, there is coincidence at gate 33 providing a signal on the output line 33*a* of gate 33. The converse is that double white signals which are not followed by black signals (detection of a part of the character) cannot pass gate 33 and are thereby ignored.

To make certain that I do not obtain a false start, e.g. by the black signal produced by scanning a speck of dirt or a smeared edge of the character, counter 35 is interposed in line 33*a*, requiring two or more successive coincidence signals on line 33*a* before the counter passes a signal. When the counter is stepped to the end, it remains in that condition until reset by a signal on line 78 (to be described later) representing the end of the character. If the counter is stepped to its second stage (by scanning a speck of dirt) it automatically resets over line 35*a* through delay 35*b* of a predetermined duration. The output line 37 of counter 35 conducts signals identical to the double white signal pulses P, P1, etc. (FIGURES 1 and 3) and therefore for convenience, they are considered to be "double white" pulses or signals in the following description.

Pulse P has a negative going side 30*a* and a positive going side 30*b* which respectively actuate one shot multivibrators 36 and 34 with which line 37 is connected. The output of one shot 36 on line 86 is the "end of scan line" signal, and the output of one shot 34 on line 38 is the "begin scan line" signal. These are repeated for each double white signal appearing on line 37, and I have already established that the double white signals resulting from scanning the space between characters (shown as dotted lines in FIGURE 3) do not reach line 37.

Two interconnected circuits 44 and 46 are controlled by the signals on lines 38 and 86. Circuit 46 has a capacitor 48 which stores a charge proportional to the distance D (FIGURES 1*a* and 3). This charge is stored during the scanning of the full character. Circuit 44 has a capacitor 82 with a different function. It has its charge continually built up during each scan line, i.e. it begins to charge at the beginning of a scan line, continues to charge until the end of the individual scan line, and then discharges. Thus, if the charges on the capacitors are compared, there will be an instant at which the charges are equal, which is the time that the Y axis multivibrators are actuated. The details of how this is done are described later, this general description being given here to better understand the objectives of circuits 44 and 46.

Circuit 44 has a flip flop 40 which is set by the output on line 38 of the "begin new scan line" multivibrator 34. The output line 66 of flip flop 40 charges capacitor 82. Flip flop 40 is reset by the output of one shot 36 on lines 86 and 87, representing the "end of scan line." As depicted in FIGURE 3, the signals involved would be side 30*b* of pulse P and side 30*c* of pulse P1. The capacitor 82 is discharged at the end of the scan line by a pulse of opposite polarity through diode 84 in a part of line 86 which is connected to line 66.

Circuit 46 has a flip flop 42 which is set simultaneously with flip flop 40 by a signal on line 39 which is connected to line 38. However, flip flop 42 does not remain set for the entire scan line like flip flop 40. Instead, it is reset when the black quantizer 32 provides an output on lines 62, 62*a*, i.e. at the time that hole 15 (FIGURE 2) is first covered by the character image after a double white signal. The output line 60 of flip flop 42 charges capacitor 48 during the time that the flip flop remains set. Capacitor 48 is not discharged until the entire character has been fully scanned which is signified by a signal on line 78 (described later). To assure that capacitor 48 is not charged during each scan line, I have an inhibit gate 61 interposed in line 60 with the inhibit signal provided on line 63 from flip flop 64. The flip flop 64 is set during the first scan line of the character, for example when there is an output on line 62 from the black quantizer 32. Flip flop 64 remains set until the character is completely scanned, at which time the end of character signal on line 78 resets the flip flop by way of line 80 and removes the inhibit signal from gate 61. At the same time the end of character signal on line 79 connected to line 78 discharges capacitor 48 through diode 74.

We now have a capacitor 82 in line 66 being charged during the time of each scan line, and capacitor 48 charged with a signal proportional to distance D for only the first scan of the character. Distance D is not computed for each scan line because it would vary for many characters such as the "4" shown in FIGURE 1*a* or the H (not shown) where the center section of the character has no element at the top thereof. The capacitive signals are applied to a differential amplifier 88 whose output line 89 conducts a signal when the two signals on line 60 and 66 become equal to each other, i.e. at the end of distance D. The signal on line 89 triggers a succession of one-short multivibrators 50–54 (Y1–Y5) inclusive. These multivibrators can be successively gated on and off, but the simpler way of serially operating them is to have the successive multivibrators triggered by the negative (or positive) going side of the output of the previous multivibrator. Multivibrators 91, 92 and 93, otherwise identified as X1, X2, and X3, are initially activated at the same time as multivibrators 50–54 by the signal on line 89 as follows. Line 94 is connected with differential amplifier output line 89, and its signal triggers multivibrator 91, provided that the multivibrators 91, 92 and 93 are not already actuated. If any of them is in operation, an inhibit signal on line 95 connected to the one-shot multivibrators 91, 92 and 93, is applied to inhibit gate 96 interposed in line 94. This feature is to prevent the continued propagation of multivibrators 91, 92 and 93 during the successive differential amplifier outputs. The end of character (last scan) multivibrator 76 is energized by the end of the multivibrator output 93. As mentioned before, one-shot 76 causes capacitor 48 to be discharged and readjusts circuit 46 to prepare it for a new character, and it is used to reset counter 35.

*Memory circuits*

I have found that I can identify all of the numerals 0–9, about half of the alphabet, and some arbitary symbols by using only seven inexpensive memory devices and minimal other equipment. The memory devices are shown as seven capacitors 98–110 inclusive. However for greater resolution or a more powerful machine the number can be increased. There are seven input gates 112–124 inclusive, each being a three input AND gate, for instance diode AND gates such as at FIGURE 7 in Patent No. 3,104,369 or Patent No. 2,932,006. One common input to these gates is the signal line 28, while the other pair of inputs for each gate is selected from the one-shot multivibrators 50–54 and 91–93. The logic is to gate information into the capacitors 98–110 in accordance with the time slot grid shown in FIGURE 2. The character information, remembered as charges on the capacitors 98–110 at given times, represented by the vertically shaded areas (FIGURE 2) of the grid, will yield all of the character identification data required. Therefore, gates 112 and 114 are open during the time of coincidence between multivibrator 91 and gates 112 and 114 respectively, while the and 128 are connected with the output terminals of multivibrator 91 and gaes 112 and 114 respectively, while the output wires 130 and 132 of multivibrators 51 and 53 are connected with gates 112 and 114 respectively. Should an information signal appear during the coincident time of gates 112 and 114, capacitors 98 and/or 100 will receive a charge. Gates 116–124 are correspondingly wired with the multivibrators 50–54 and 91–93 to make the corresponding gates sensitive to incoming information signals on line 28 until the completion of all lines of the character scan.

The vertically arranged areas of grid G (FIGURES 1 and 2*a*) are vertically long and horizontally narrow whereas the horizontal areas are horizontally long and vertically short. The setting of the multivibrator times are responsible for generating such differences in time-areas. The reason is that matchstick characters are comparatively tall. When the vertical features of a character are being scanned the output signals applied to the corresponding capacitors 98, 100, 108 and 110 will be for a longer time than those for the horizontal areas corresponding to capacitors 102, 104 and 106 respectively. In order to keep the comparative information in balance, it is only necessary to adjust multivibrator 92 so that its duration is twice as long as the other X-axis multivibrators 91 and 93. This would mean that twice as many scans of the character would fall in the middle vertical time slot as in the end vertical time slots.

Memory capacitors 98–110 are loaded through constant current devices 142 so that the capacitor charge is proportional to the duration of signal impressed thereon. Patent No. 3,104,369 describes a comparator and decision section, which may be used herein with the outputs from the storage capacitors 98–110. That application also describes an "assertion" and "negation" technique to emphasize differences (usually small) deemed significant and to attribute significance to the lack of a feature in a given area. I obtain asertion and negation voltage proportional to the charge on the capacitors by taking parallel lines, for instance lines 146 and 148 from the constant current device 142, and placing an inverter 150 in one of the lines, ahead of the comparator 140. To further explain "assertion" and "negation," asume that the numeral "8" completely superimposes on the numeral "3". By using negations in the comparator, the comparator determines the difference betwen the "8" and "3," i.e. that the character is a "3," by requiring that there be no signal from areas X1, Y2 and X1, Y4. The "negation" of each of these areas, i.e. capacitor storage 98 and 100, would be used in this determination.

I have the option of gating the information stored in capacitors 98–110 into comparator 140 at the end of the scanning of the character, or simply triggering the comparator 140 at the end of the character. Line 154 connected with the output of one-shot multivibrator 76 and comparator 140 illustrates the latter option.

Considering the cases where all characters to be read do not have a piece at one predetermined corner, my circuits may be arranged to recompute distance "D" for the highest part of the character which comes into the view of the scanner. FIGURE 4 is to be considered in conjunction with FIGURE 1 since it is merely an additional feature used with the same scanner, X and Y generators, gating connected therewith the most of the control circuits.

The character "1," as shown in FIGURE 4*a* is a good example of a character which has no part at the upper left corner. In a machine which seeks a character part at that corner to compute distance "D," the "1" would present a problem because the "D" distance would be entirely too long to enable enough of the vertical part of the "1" to be stored. What the circuit in FIGURE 4 does is allow the left horizontal part of the "1" to be stored on the basis of the "large" distance D–1 (FIGURE 4*a*), and the balance of the "1" to be stored on the basis of a new computation of distance, i.e. D–2. This stores the information irregularly, but sufficient for recognition.

FIGURE 4 shows a conventional ramp signal generator 180 triggered by the trailing edge of the double white quantized signal, e.g. on line 29*a*. The ramp signal on line 66*a* from the generator 180 is applied to a comparator, e.g. differential amplifier 88*a*, as one of its inputs. The other input is line 60*a* having storage capacitor 48*a* connected thereto. A relay assembly including relays 188 and 190 (or the equivalent) is interposed in line 60*a* between capacitor 48*a* and the connection of line 60*a* with line 66*a*.

The circuit functions as follows: The double white signal on line 29*a* trigger generator 180 to provide a saw tooth or other kind of ramp signal, corresponding to what capacitor 82 sees in FIGURE 1. Relay 188 is normally closed, and opened by a "black" signal e.g. on line 62*a* which sets flip flop 62*b* to provide a signal on flip flop line 62*c* to open the contacts of relay 188. Thus, the charge of capacitor 48*a* will correspond to distance D–1 (FIGURE 4*a*). For the first few scans of the "1" the distance D–1 will apply, and the output line 89*a* of amplifier 88*a* serves the same purpose of line 89 in FIGURE 1.

When the vertical feature of the "1" is scanned and distance D–1 must be recomputed to D–2 (FIGURE 4*a*) the relay assembly is operated. In addition to relay 188, the relay assembly has a normally open relay 190 whose switch section is connected in parallel with the switch of relay 188. Relay 190 has its coil energized by a one shot multivibrator 192 which is controlled by AND gate 194. The inputs of gate 194 are the signal line 62*a* and the inversion of the comparator output line 89*a*, i.e. "not 89*a*" developed by a lead 196 connected to line 89*a* and having an inverter 198 interposed therein. Thus, if a "black" signal occurs during time D–1, as is the case of FIGURE 4*a*, relay 190 closes causing capacitor 48*a* to be charged instantly with the voltage on line 60*a*, i.e. the part of the ramp corresponding to the top of the vertical part of the "1". When the "1" has been completely scanned, the circuit of FIGURE 4 is prepared for a new character by resetting flip flop 62*b* by a signal on line 78*a* which corresponds to line 78 in FIGURE 1.

In place of the circuits of FIGURE 4, I can substitute a pre-scanner and simple memory circuit which determines the maximum height of the character shortly before it reaches scanner 10. The pre-scanner (not shown) circuit would then be capable of charging capacitor 48 proportional to the correct distance D for the character at the beginning of the scanning by scanner 10.

It is understood that the illustrated embodiment is given by way of example and that all changes, alterations and modifications falling within the scope of the claims may be resorted to.

I claim:

1. In a character reading machine which has a scanner producing vertical scan lines and providing an information output each time that a said scan line crosses a part of the character, first means to provide a plurality of electrical signals which electronically represent a series of successive horizontal time slots timed with the scan lines, second means to serially provide a plurality of electrical signals which electronically represent a group of vertical time slots which intersect the horizontal time slots to define electronically represented time zones which correspond to units of area of the character, said signals representing said vertical slots being of a duration longer than the time required for two scan lines to traverse the character, some of said time zones being longer than others to provide wider acceptance zones for predetermined scanner outputs, means for detecting the scanner information outputs occurring in selected time zones to provide output signals corresponding to the character information occurring in said zones, and storage means operatively connected with said detecting means for storing said output signals.

2. The reading machine of claim 1, and means operable with said analog storage means for causing said analog storage means to store said output signals as information signals whose values correspond to both the magnitude and duration of said output signals.

3. The reading machine of claim 1, and means to provide a reference signal which bears a predetermined time-space relationship to the beginning of said scan lines, said first means including means for measuring and remembering the time required for a scan line to move from said reference signal to one edge of the character and providing a distance signal corresponding thereto, means responsive to said distance signal for initiating said series of horizontal time slots by actuation of said first means, and means subsequently operative during each of the successive scans of the character for repetitively actuating said first means in response to said distance signal.

4. The reading machine of claim 3, and said second means including voltage output devices which are triggered for operation once during the scanning of the entire character by all of the scan lines, time slot representing means include means for measuring and remembering the distance between an artificial reference and one edge of the character being scanned after which the first series of horizontal time slots is represented, means subsequently operative during successive scans of the character for reestablishing said horizontal time slots representing signals at the same remembered distance from said reference, and said means for representing the vertical time slots including voltage output devices which are triggered for operation once during the scan of the entire character.

5. In a reading machine having a scanner to scan a character and its background by a succession of scan lines, means providing a reference signal which bears a time-space relationship to the position of an unknown character in the field of view of the scanner, means operative during a scan line for generating and remembering a signal corresponding to the time required for a scanline to traverse the distance between said reference and an edge of the unknown character in the view of said scanner, storage devices associated with zones of the character area to store scan information relating to character-identity which originates from predetermined zones of said area, and means responsive to said remembered signal for defining said zone by triggering the loading of said storage devices with scanner outputs relating to the character at a place of each scan line which corresponds to said distance between said reference and said edge of the character, and means to adjust said remembered signal during the scanning of a character to correspond to any part of the character which is nearer to said reference than said edge.

6. The subject matter of claim 5 wherein the reading machine is an optical reading machine for characters with a contrasting background, said scanner outputs being information signals which vary in proportion to the amount of contrast, and means operative with said storage devices for storing signals proportional to the value and duration of said information signals.

7. In a reading machine for a character on a contrasting background; the combination of a movable mechanical scanning member having a plurality of spaced apertures; a photocell in optical alignment with a portion of said mechanical scanning member and having a field of view with a predetermined dimension measured substantially parallel to the direction of motion of said apertures as they pass thereacross; an amplifier operatively connected with said photocell, the spacing of said apertures being such in relation to the size of the field of view of said photocell that as said scanning member moves, two of said apertures become concurrently exposed to said field so that the amplifier provides an output control signal corresponding to the amount of light transconducted through both of said apertures, after which one of said two apertures moves out of said field and the other aperture completes a traverse of the character and its background in said field so that the same amplifier first provides said control signal and then provides information outputs which are distinguishible from said control signal and which correspond to the character and its background respectively.

8. In a character reading machine for a character on a background area, wherein the reading machine has a scanner which examines the area by a succession of adjacent scan lines and provides information outputs when the scan lines intercept the character, a plurality of memory devices, there being a memory device associated with each zone of the character area where a zone is defined as a subarea of said area crossed by only a corresponding portion of each of a plurality of said scan lines, the total number and arrangement of said zones covering selected parts of the character area less than the combined character and background area, a control gate associated with each memory device, means to control said gates in such a manner that predetermined information outputs of the scanner are impressed on predetermined memory devices depending on the zone of the character area from which the information outputs are extracted, said control means including means providing a first group of successive signals whose total duration corresponds to the time required for all of the scan lines to cover the area, and means providing a second group of successive signals sequentially operable during each scan line in a manner such that said successive signals of said first and second groups intersect in time to establish in time a grid of time zones which correspond to said subarea zones, means for conducting predetermined sets of signals composed of a signal from each group to preselected gates to enable said preselected gates, and means to conduct said information outputs to all of said gates so that only the gates enabled by a set of said signals from both groups pass information to its associated memory device.

9. The subject matter of claim 8 and means responsive to said control means to provide a reference signal earlier than the actuation of said groups of signals providing means, and means to initiate said second group of signals providing means at predetermined time intervals measured during the traversal of each scan line from the time of said reference signal.

References Cited by the Examiner

UNITED STATES PATENTS

| | | |
|---|---|---|
| 2,738,499 | 3/56 | Sprick. |
| 2,918,653 | 12/59 | Relis. |
| 2,928,074 | 3/60 | Sutter. |
| 3,025,495 | 3/62 | Endres. |

MALCOLM A. MORRISON, *Primary Examiner.*